US007664593B2

(12) United States Patent
Barillon et al.

(10) Patent No.: US 7,664,593 B2
(45) Date of Patent: Feb. 16, 2010

(54) METHOD AND SYSTEM FOR ESTIMATING EXHAUST GAS TEMPERATURE AND INTERNAL COMBUSTION ENGINE EQUIPPED WITH SUCH A SYSTEM

(75) Inventors: Pascal Barillon, Issy-les-Moulineaux (FR); Fabrice Gauvin, Mennecy (FR); Marc Lucea, Paris (FR); Emmanuel Poilane, Arpajon (FR)

(73) Assignee: RENAULT s.a.s., Boulogne Billancourt (FR)

( * ) Notice: Subject to any disclaimer, the term of this patent is extended or adjusted under 35 U.S.C. 154(b) by 330 days.

(21) Appl. No.: 11/576,695

(22) PCT Filed: Oct. 5, 2005

(86) PCT No.: PCT/FR2005/050811

§ 371 (c)(1),
(2), (4) Date: Apr. 5, 2007

(87) PCT Pub. No.: WO2006/037926

PCT Pub. Date: Apr. 13, 2006

(65) Prior Publication Data

US 2008/0082289 A1 Apr. 3, 2008

(30) Foreign Application Priority Data

Oct. 6, 2004 (FR) .................................. 04 10523

(51) Int. Cl.
*G06F 19/00* (2006.01)
*G06F 11/30* (2006.01)

(52) U.S. Cl. ........................ 701/106; 701/115; 702/182
(58) Field of Classification Search ......... 701/101–106, 701/109, 115; 123/480, 486, 488, 676; 73/114.69; 702/130, 182, 183
See application file for complete search history.

(56) References Cited

U.S. PATENT DOCUMENTS

| 5,311,421 A * | 5/1994 | Nomura et al. ............... 700/37 |
| 5,832,421 A | 11/1998 | Santoso et al. |
| 6,401,457 B1 | 6/2002 | Wang et al. |
| 6,405,122 B1 * | 6/2002 | Yamaguchi .................. 701/106 |
| 6,687,597 B2 * | 2/2004 | Sulatisky et al. ............ 701/104 |
| 6,882,929 B2 * | 4/2005 | Liang et al. .................. 701/115 |

FOREIGN PATENT DOCUMENTS

| DE | 10203920 A1 * | 9/2003 | ................. 701/106 |
| EP | 1 024 260 | 8/2000 | |
| EP | 1041264 | 10/2000 | |
| EP | 1357487 | 10/2003 | |
| WO | 9605421 | 2/1996 | |

* cited by examiner

*Primary Examiner*—Willis R Wolfe, Jr.
(74) *Attorney, Agent, or Firm*—Oblon, Spivak, McClelland, Maier & Neustadt, L.L.P.

(57) ABSTRACT

A method for estimating temperature of an internal combustion engine exhaust gases, a system for estimating exhaust gas temperature, and an engine equipped with such a system. The method uses an estimator with a neural network provided with a feedback loop returning directly or indirectly in the network input one or more quantities of the network output.

14 Claims, 3 Drawing Sheets

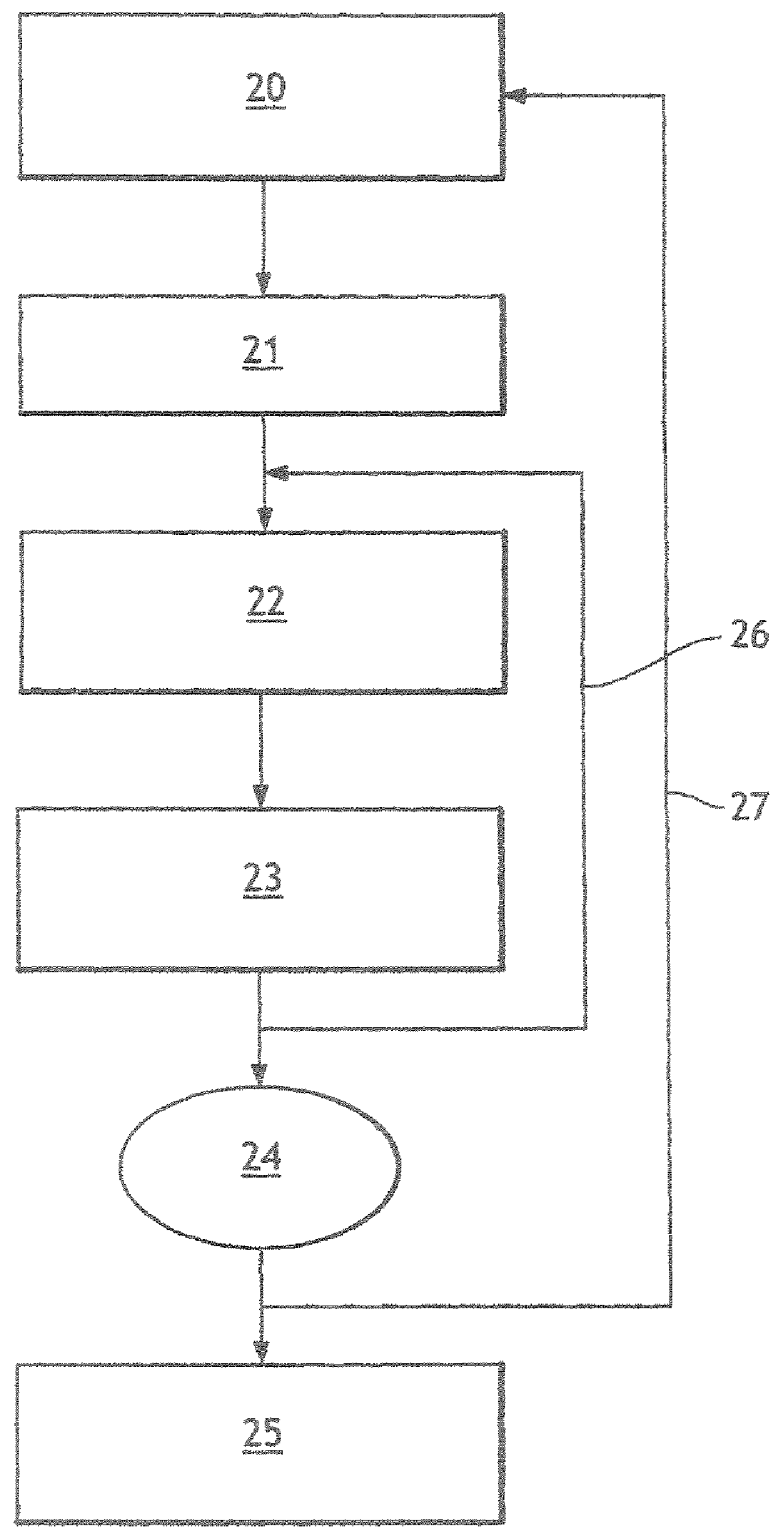

METHOD AND SYSTEM FOR ESTIMATING EXHAUST GAS TEMPERATURE AND INTERNAL COMBUSTION ENGINE EQUIPPED WITH SUCH A SYSTEM

The invention relates to the field of the control of internal combustion engines, and particularly of exhaust devices mounted downstream of the engine exhaust manifold.

The invention relates more particularly to a method and a system for estimating an exhaust gas temperature, and to an internal combustion engine and a vehicle equipped with such a system.

To deal with motor vehicle emissions of polluting gases, gas post-treatment systems are generally placed in the engine exhaust line.

These systems are designed to reduce the emissions of carbon monoxide, unburnt hydrocarbons, as well as particulates and nitrogen oxides.

Some of these systems operate intermittently or alternately in the sense that they alternate the pollutant storage phases with the trap regeneration phases (that is, the conversion of the stored pollutants to nonpolluting substances).

To optimize the treatment of all the pollutants, it is necessary to control these phases of storage and regeneration as closely as possible. It is necessary in particular to estimate the trapped masses over time (that is of the particulates in the case of a particulate filter, the nitrogen oxides in the case of the nitrogen oxide trap).

Similarly, it is necessary to determine the change over time of the masses converted during the regeneration phases.

In fact, the variation of these masses during the storage and/or regeneration phases depends directly on the temperature of the support of these traps and of the gases passing through them. An attempt is therefore made to determine, if not, control, the temperature of the gases entering these traps.

Furthermore, the increasing complexity of engines and of their operating modes demands increasingly sophisticated electronic management means and, accordingly, a growing number of measurement and estimating means. However, it so happens that numerous physical quantities are not directly measurable, or that the necessary sensors are too expensive or even inappropriate.

To control the regeneration of the traps and to control the engine itself, it therefore appears necessary to know the temperature of the engine exhaust gases. It may therefore prove to be particularly useful to obtain an accurate estimate of the exhaust gas temperature entering a post-treatment system placed downstream of the turbine of a supercharged engine.

To determine the gas temperature upstream of a device for the physical and/or chemical treatment of the exhaust gases, use is made today of a temperature sensor, or a model for estimating this temperature and implemented by an onboard electronic computer.

However, the use of a sensor placed in the exhaust line has many drawbacks.

The accuracy of a sensor is in fact inversely proportional to the operating range; that is the wider the range of temperatures to be measured, the lower the measurement accuracy. This accuracy may, moreover, drift with the thermal aging or fouling of the sensor.

Moreover, the cost of use of a sensor may prove to be high. It is in fact necessary to combine the intrinsic cost of the sensor with that of the connections of the input port in the computer, and of the software driver.

Furthermore, it is also necessary to have appropriate means for diagnosing the operating status of the sensor.

The use of models also has drawbacks. While these models are generally reliable in steady state conditions, they are rather mediocre in unsteady state conditions. Besides, numerous parameters (physical parameters, variables of state) necessary for these models are difficult to identify or measure on an engine.

Furthermore, most of the time, these models are too "greedy" in terms of computation load or memory resource to be implemented in an electronic engine control computer.

Another solution proposed is to estimate the exhaust gas temperature by using a solid state neural network. Reference can be made to the French patent application of the applicant filed 19 Dec. 2003 under No. FR 03 15112.

However, the solution described in this document only serves to take account partially of the record of the system. The estimation thereby made of the temperature, both in steady state and unsteady state conditions, is therefore inaccurate.

It is the object of the present invention to improve the knowledge of an exhaust gas temperature, and particularly of the temperature upstream of a device for the physical and/or chemical treatment of the exhaust gases.

For this purpose, the invention proposes a method for estimating an exhaust gas temperature of an engine, characterized in that an estimator with a neural network is used, provided with a feedback loop returning, directly or indirectly, to the network input, one or more of the quantities available at the network output.

Some preferred, but nonlimiting aspects of the inventive method are as follows.

data is supplied at the input of the estimator, relative to the gas temperature upstream of the turbine placed on the engine exhaust line, the estimator supplying, at the output, the estimate of the exhaust gas temperature downstream of said turbine;

the method may implement a postprocessing of the temperature estimate made by the neural network;

the method make a feedback of the estimated temperature available at the output of the postprocessing module;

the method may implement a preprocessing of one or more of the estimator input variables by making calculations based on known physical equations;

the method may implement a reprocessing of some of the quantities at the network output before they are returned, according to a so-to-speak indirect relooping, to the network input;

the method may comprise a prior estimator learning step using a database representative of important operating zones.

According to another aspect, the invention relates to a system for estimating an exhaust gas temperature of an engine, characterized in that it comprises an estimator with a neural network provided with a feedback loop returning, directly or indirectly, one or more of the network output variables to the network input.

According to further aspects, the invention relates to an internal combustion engine and to a motor vehicle equipped with a system for estimating an exhaust gas temperature according to the invention.

Other aspects, goals and advantages of the invention will appear from a reading of the following detailed description of preferred embodiments thereof, giving nonlimiting examples and with reference to the drawings appended hereto in which:

FIG. 3 is a diagram showing the steps of the method for estimating an exhaust gas temperature according to one aspect of the invention.

Figure 1:
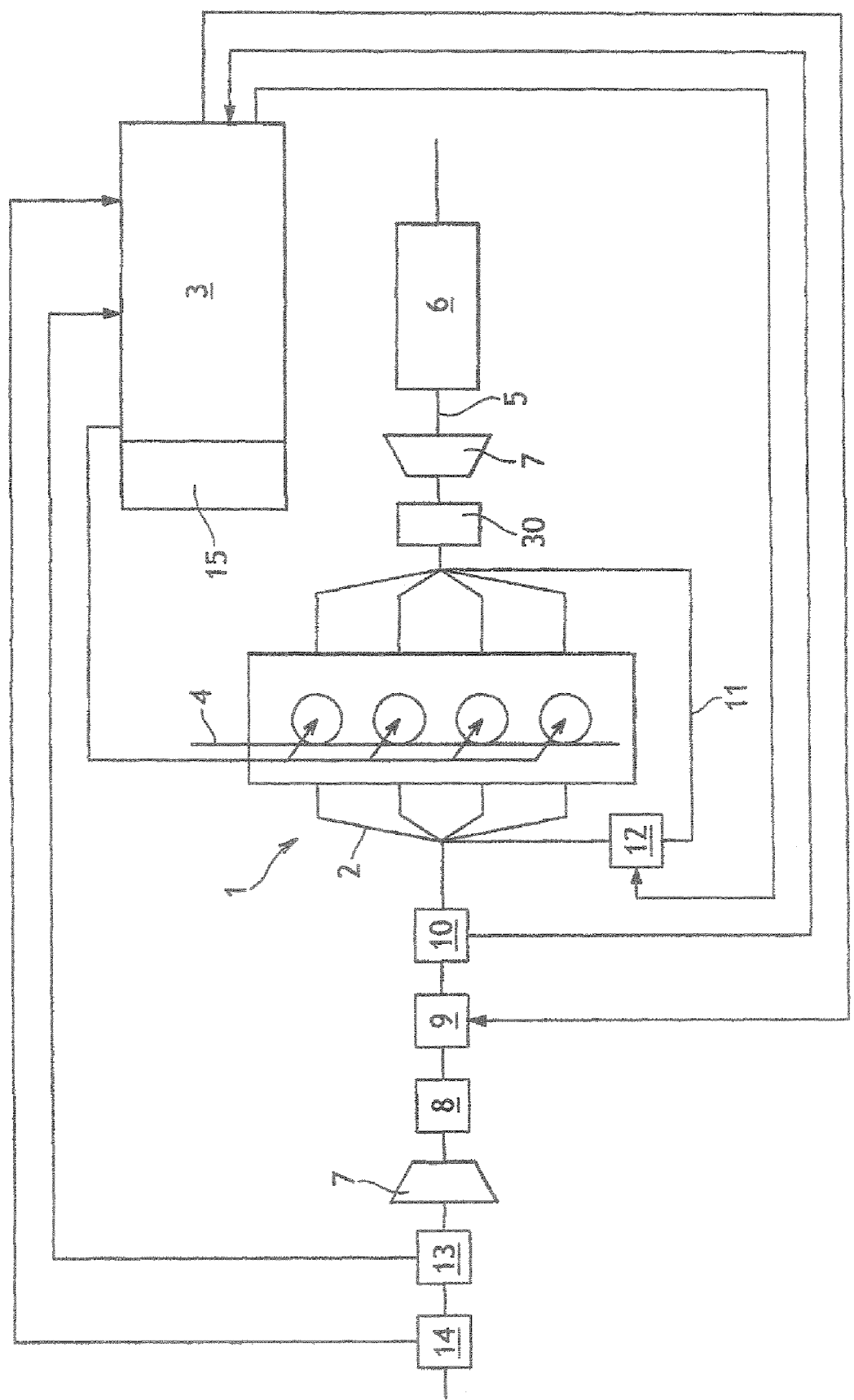
FIG. 1 is a schematic view of an internal combustion engine according to one aspect of the invention.

In FIG. 1, only the elements necessary for an understanding of the invention have been shown. An internal combustion engine 1 is designed to be mounted on a vehicle such as an automobile. The engine 1 is, for example, a diesel engine, supercharged by a supercharger with four cylinders in line and direct fuel injection. The engine 1 comprises an intake circuit 2 for its air feed an engine control computer 3, a pressurized fuel circuit 4, and a gas exhaust line 5. The fuel is injected into the cylinders by injectors, not shown, discharging into the combustion chambers and controlled by the computer 3 via the circuit 4.

At the outlet of the engine 1, the exhaust gases removed in the exhaust line 5 pass through one or more postprocessing devices 6 (for example, particulate filter, nitrogen oxide filter). A supercharger 7 comprises a compressor placed on the intake circuit 2 and a turbine placed on the exhaust line 5. Between the compressor and the engine 1, the intake circuit 2 comprises a heat exchanger 8 for cooling the compressed air at the compressor outlet and for thereby increasing its density, an air intake flap 9 controlled by the computer 3, and a pressure sensor 10 connected to the computer 3.

At the outlet of the engine 1, upstream of the turbine, the exhaust line 5 further comprises means 30 for supplying data relative to the exhaust gas temperature upstream of the turbine. Said means 30 consists, for example, of a temperature measurement probe or an estimator designed to provide an estimate of said gas temperature upstream of the turbine.

The engine 1 also comprises an exhaust gas recycle circuit 11 equipped with a valve 12 whereof the opening is controlled by the computer 3; exhaust gases can thereby be reintroduced into the intake circuit 2. An air flowmeter 13 is mounted in the intake circuit 2 upstream of the compressor to supply the computer 3 with data on the intake air flow rate to the engine. Sensors 14, for example, pressure or temperature sensors, may also be provided.

The computer 3 conventionally comprises a microprocessor or central processing unit, storage zones, analog-to-digital converters and various input and output interfaces. The microprocessor of the computer comprises electronic circuits and appropriate software for processing the signals from the various sensors, determining the status of the engine therefrom, and generating appropriate control signals for the various controlled actuators such as the injectors.

The computer 3 thereby controls the fuel pressure in the circuit 4 and the opening of the injectors, from the data delivered by the various sensors and particularly the mass of inlet air, the engine speed, and stored calibrations for obtaining the desired consumption and performance levels.

The computer 3 further comprises an estimator 15 with a neural network provided for making an estimate of the exhaust gas temperature upstream of the postprocessing device(s).

For reasons of simplicity and for sharing a number of resources, particularly computation and memory, it is particularly advantageous to have the estimator 15 in the computer 3.

Figure 2:
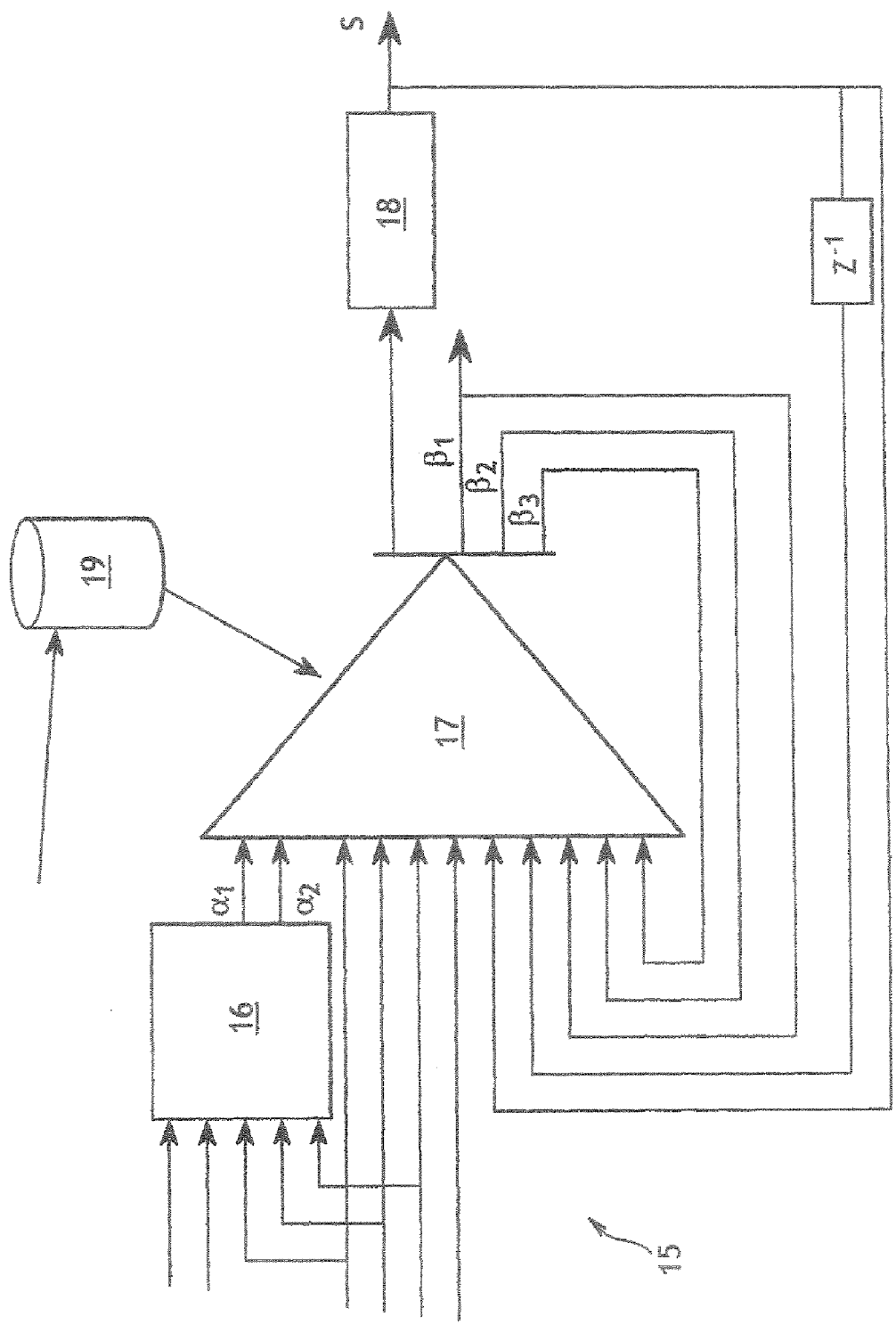
FIG. 2 is a schematic view of a system for estimating an exhaust gas temperature according to one aspect of the invention.

As shown in FIG. 2, the estimator 15 comprises a preprocessing module 16, a neural network 17 and a postprocessing module 18. The estimator 15 further comprises a feedback loop for returning, to the input of the neural network, one or more of the output variables of said network.

The estimator 15 further comprises an input for the data relative to the exhaust gas temperature upstream of the turbines as supplied, for example, by the means 30.

The estimator may also comprise one or more other inputs relative to physical quantities representative of the status of the engine, such as for example:
  gas flow rates,
  gas pressure upstream of the turbine,
  gas backpressure downstream of the turbine,
  position of the supercharger fins,
  vehicle speed,
  ambient air temperature,
  position of exhaust gas recycle valve,
  supercharging pressure measured by the pressure sensor placed downstream of the compressor, the heat exchanger and the air intake flap,
  air temperature in the intake circuit.

The estimator may also receive at the input the engine speed fuel flow rate and air flow rate.

The neural network 17 consists of a number of neurons defined by their parameters (weight, bias), and by their activation functions. The output s of a neuron is connected to the inputs $(e_1, e_2, \ldots, e_n)$ of the neuron by $s=F(e_1*w_1+e_2*w_2+\ldots+e_n*w_n+b)$ where F is the neuron activation function, $w_1, w_2, \ldots w_n$ the weights and b the bias.

The number of neurons in the network, the values of the weights and biases of the various neurons, are parameters suitable for calibration which may, in particular, be determined during a learning phase and are described in greater detail below.

The preprocessing module 16 serves to process one or more of the estimator input variables by making calculations based on known physical equations. The preprocessing module 16 serves in particular to reduce the number of inputs of the neural network 17 by calculating one or more variables $\alpha_1, \alpha_2$ each representative of one or more physical quantities, measurable or not, absent at the input of the computer 3, from several input variables. The module 16 also serves to filter certain inputs liable to assume erroneous values.

The neural network 17 has an output channel relative to the desired temperature estimation, and optionally one or more other output channels relative to nonmeasurable quantities of state for direct or indirect relooping to the input of the network 17.

The postprocessing module 18 serves to process the temperature estimate available at the output of the neural network 17 to transmit a temperature signal S estimated at the output of the estimator, to the computer 3. This processing may, for example, be a filtering for making the estimator robust by limiting the return of erroneous data to the input.

As mentioned previously, one or more of the output variables of said network follow a feedback loop and are returned to the input of the neural network.

Some of the output variables of the network may be processed (for example filtered, delayed or associated with other inputs in the preprocessing module) before being returned to the network input.

FIG. 2 illustrates the case in which the quantities of state $\beta_1, \beta_2, \beta_3$ (nonmeasurable and only known during the learning phase) available at the output of the network 17 are relooped to the input of said network 17.

Also illustrated is the case in which the output S of the estimator (that is the estimate of the temperature downstream of the turbine placed on the gas exhaust line) available at the output of the postprocessing module 18 (and whereof the value is measurable here during the learning phase) is on the one hand directly relooped to the input of the network 17, and on the other, relooped after having been delayed (cf. delayer represented by the symbol $z^{-1}$) to the input of the network 1.

By carrying out such a feedback of one or more of the output variables of the neural network, said network uses, at the input of its estimation function one or more of the values predicted at the preceding computation steps by the same estimation function, and whether or not these values have been measured during the learning phase.

Such a feedback relooping has the advantage of being able to take account of highly dynamic mechanisms.

The use of nonlinear activation functions in the neural network also serves to take account of nonlinear mechanisms.

The neural network 17 can thereby be qualified as recurrent or dynamic, and differs in this respect from the static network solution described in French patent application No. FR 03 15112 previously discussed.

The estimator 15 finally serves to obtain an estimate of the temperature downstream of the turbine and upstream of a postprocessing device. The estimator may therefore be seen as implementing a transfer function using as input data relative to the temperature upstream of the turbine, and optionally, one or more other data relative particularly to physical quantities, to provide the desired temperature estimate at the output.

The following description concerns the design and learning of the estimator 15.

Once the estimator has been developed and implemented for example in the engine electronic management software, it is necessary to select the neural network, particularly by determining the number of neurons and by calibrating the parameters (weight, bias).

The learning of the neural network can be carried out on a computer using data collected on the vehicle.

The neural network may be the subject of a learning by a learning algorithm method, particularly using a database 19.

The database 19 may be supplied from actual test track results of a vehicle with tests at various gearbox ratios, with various accelerations and decelerations the overall conditions being selected to be representative of normal vehicle operating conditions. Furthermore, the database supplied from track tests can be split into a learning base and a test base, in order to reduce the size of the database 19 which forms the learning base. The parameters (or calibrations) determined during the learning phase may be stored in the memory of the computer 3. Alternatively, the database 19 is a separate base from the vehicle, used during vehicle initialization operations or during maintenance operations.

FIG. 3 shows the design and learning steps of the neural network estimator.

In step 20, tests are performed for generating data to fill in the database 19 (cf. arrow to the base 19 in FIG. 2), the data being representative of important operating zones. It is effectively necessary to scan in a representative manner the variation space (or at least part thereof) of the inputs and outputs of the estimator.

It may be useful to clean up the data by signal processing, for example to eliminate erroneous points, to eliminate redundant points, to resynchronize or to filter the data.

In step 21, the data are split into two parts to form a test base and a learning base. In step 22, the preprocessings to be run by the preprocessing module 16 are determined and the neural network 17 performs the learnings from the learning database. In step 23, the performance is tested with one or more validation criteria, on the test base and on the learning base. In step 24, the neural network 17 is selected, and in step 25, the performance and tests on the vehicle are characterized.

The arrow issuing from the base 19 in FIG. 2 illustrates the way in which the database 19 is used for the learning and validation of the estimator 15.

Between steps 23 and 24, a relooping 26 may be provided to backtrack to upstream of the step 22 to make a number of iterations with possible modifications of the number of neurons, the inputs, outputs, number zoning of the networks, architecture of the neural network(s) 17, type of learning, optimization criteria, etc.

This iterative process (relooping 26) serves to develop the desired estimator (accuracy, robustness), at minimum cost (number of inputs, number of computations number and difficulty of tests, etc.).

Between steps 24 and 25, a relooping 27 may be provided if it turns out that the data generated in step 20 are insufficient. Step 20 is then repeated to generate new data needed to replace the previously acquired data or to supplement them in order to establish a sufficient number of measurement points.

For example, it may be possible to provide for 5000 measurement points in the learning base.

During test step 23, selection criteria may be provided for selecting the set of parameters for the most accurate estimation (for example by eliminating points of which the error is greater than 50° C., by determining a mean error close to 5° C., or by determining a low sliding mean error.

Finally, the use of the invention for estimating the exhaust gas temperature consumes very little of the resources of the computer (computation load, memory required), uses a limited number of parameters, and can therefore be easily implemented.

Furthermore, as soon as the database useful for learning is sufficiently representative of all the subsequent operating conditions, the gas temperature of the turbine outlet or upstream of the postprocessing system can be estimated accurately (within a few degrees) whether in steady state or unsteady state conditions.

The invention claimed is:

1. A method of estimating an exhaust gas temperature of an engine, comprising:
   estimating the exhaust gas temperature of the engine using an estimator with a neuronal network, provided with a feedback loop, returning, directly or indirectly, to a network input, one or more of quantities available at an output of the network.

2. The method as claimed in claim 1, wherein data is supplied at an input of the estimator, relative to gas temperature upstream of a turbine placed on an engine exhaust line, the estimator supplying, at an output, an estimate of the exhaust gas temperature downstream of the turbine.

3. The method as claimed in claim 1, implementing a preprocessing of one or more estimator input variables by making calculations based on known physical equations.

4. The method as claimed in claim 1, implementing a reprocessing of some of quantities at the network output before they are returned, according to an indirect relooping, to the network input.

5. The method as claimed in claim 1, further comprising a prior estimator learning using a database representative of important operating zones.

6. The method as claimed in claim 1, implementing a postprocessing of the temperature estimate made by the neuronal network.

7. The method as claimed in claim 6, wherein a feedback is made of the temperature estimate at an output of the postprocessing.

8. A system for estimating an exhaust gas temperature of an engine, comprising:

an estimator configured to estimate the exhaust gas temperature of the engine with a neural network including a feedback loop returning, directly or indirectly, one or more of network output variables to a network input.

9. The system as claimed in claim 8, wherein the estimator includes an input configured to receive data about exhaust gas temperature upstream of a turbine placed on an exhaust line of the engine, the estimator supplying, at an output, an estimate of the exhaust gas temperature downstream of the turbine.

10. The system as claimed in claim 8, wherein the estimator comprises a preprocessing module placed upstream of the neural network and configured to process one or more input variables of the estimator by making calculations based on known physical equations.

11. An internal combustion engine comprising a system for estimating an exhaust gas temperature as claimed in claim 8.

12. A motor vehicle comprising a system for estimating an exhaust gas temperature as claimed in claim 8.

13. The system as claimed in claim 8, wherein the estimator comprises a postprocessing module placed downstream of the neural network and configured to process a temperature estimate produced by the neural network.

14. The system as claimed in claim 13, further comprising a feedback of the temperature estimate, available at an output of the postprocessing module.

\* \* \* \* \*